United States Patent
Inomata et al.

(10) Patent No.: US 9,726,873 B2
(45) Date of Patent: Aug. 8, 2017

(54) MICROSCOPE AND MAGNIFYING OBSERVATION METHOD USING THE SAME

(71) Applicant: Keyence Corporation, Osaka (JP)

(72) Inventors: Masahiro Inomata, Osaka (JP); Shohei Yamamoto, Osaka (JP)

(73) Assignee: Keyence Corporation, Osaka (JP)

( * ) Notice: Subject to any disclaimer, the term of this patent is extended or adjusted under 35 U.S.C. 154(b) by 296 days.

(21) Appl. No.: 14/551,108

(22) Filed: Nov. 24, 2014

(65) Prior Publication Data
US 2015/0185462 A1    Jul. 2, 2015

(30) Foreign Application Priority Data

Dec. 27, 2013  (JP) ................... 2013-273622

(51) Int. Cl.
*G02B 21/36* (2006.01)
*G02B 21/24* (2006.01)
*G02B 21/26* (2006.01)

(52) U.S. Cl.
CPC ......... *G02B 21/362* (2013.01); *G02B 21/241* (2013.01); *G02B 21/26* (2013.01); *G02B 21/367* (2013.01)

(58) Field of Classification Search
CPC .... G02B 21/362; G02B 21/241; G02B 21/26; G02B 21/367
See application file for complete search history.

(56) References Cited

U.S. PATENT DOCUMENTS

| 6,259,473 | B1 * | 7/2001 | Iko ................. G01N 23/04 348/80 |
| 2005/0237604 | A1 * | 10/2005 | Kawano ........... G02B 21/0012 359/368 |
| 2008/0297596 | A1 | 12/2008 | Inomata et al. |
| 2008/0297597 | A1 * | 12/2008 | Inomata ............ G03B 7/00 348/80 |
| 2010/0149362 | A1 | 6/2010 | Kang |

(Continued)

FOREIGN PATENT DOCUMENTS

| JP | 2001-059599 | 3/2001 |
| JP | 2004-151303 | 5/2004 |

(Continued)

*Primary Examiner* — Thai Tran
*Assistant Examiner* — Christopher T Braniff
(74) *Attorney, Agent, or Firm* — Kilyk & Bowersox, P.L.L.C.

(57) ABSTRACT

In a microscope which can incline an imaging section, a height position of an observation target is automatically matched to a eucentric position. The microscope includes: a placement stage on which an observation target is placed; a lower stage lifting section that vertically movably supports the placement stage; a first driving mechanism that drives the lower stage lifting section; an imaging section that captures an image of the observation target; and an upper stage lifting section that vertically movably supports a fitting member along an optical axis and is swingable about a swinging axis orthogonal to the optical axis, wherein the first driving mechanism can drive the lower stage lifting section such that the surface of the observation target placed on the placement stage is matched to a focal position of imaging unit, or a height position of the swinging axis.

5 Claims, 9 Drawing Sheets

(56) References Cited

U.S. PATENT DOCUMENTS

| | | |
|---|---|---|
| 2010/0149363 A1 | 6/2010 | Inomata et al. |
| 2010/0149364 A1 | 6/2010 | Kang |
| 2013/0050464 A1 | 2/2013 | Kang |
| 2013/0088586 A1 | 4/2013 | Sekiya et al. |
| 2013/0093872 A1 | 4/2013 | Kang |
| 2013/0100170 A1 | 4/2013 | Matsumura et al. |

FOREIGN PATENT DOCUMENTS

| | | |
|---|---|---|
| JP | 2004-153462 | 5/2004 |
| JP | 2004-170574 | 6/2004 |
| JP | 2006-030969 | 2/2006 |
| JP | 2006-308808 | 11/2006 |
| JP | 2006-337470 | 12/2006 |
| JP | 2006-337471 | 12/2006 |
| JP | 2008-299711 | 12/2008 |
| JP | 2008-301331 | 12/2008 |
| JP | 2008-301332 | 12/2008 |
| JP | 2009-128726 | 6/2009 |
| JP | 2009-128881 | 6/2009 |
| JP | 2010-130408 | 6/2010 |
| JP | 2010-139890 | 6/2010 |
| JP | 2010-141697 | 6/2010 |
| JP | 2010-141698 | 6/2010 |
| JP | 2010-141699 | 6/2010 |
| JP | 2010-141700 | 6/2010 |
| JP | 2011-259502 | 12/2011 |
| JP | 2011-259503 | 12/2011 |
| JP | 2011-259504 | 12/2011 |
| JP | 2012-145722 | 8/2012 |
| JP | 2013-050594 | 3/2013 |
| JP | 2013-083743 | 5/2013 |
| JP | 2013-088530 | 5/2013 |
| JP | 2013-088676 | 5/2013 |

\* cited by examiner

MICROSCOPE AND MAGNIFYING OBSERVATION METHOD USING THE SAME

CROSS-REFERENCE TO RELATED APPLICATIONS

The present application claims foreign priority based on Japanese Patent Application No. 2013-273622, filed Dec. 27, 2013, the contents of which is incorporated herein by reference.

BACKGROUND OF THE INVENTION

1. Field of the Invention

The present invention relates to a microscope and a magnifying observation method using the same.

2. Description of Related Art

In observation using a microscope, an image of an observation target as a target for observation is captured by an imaging section, and magnified and displayed. Further, in the microscope, there may be performed inclined observation where the imaging section is inclined and a specimen is observed from diagonally above so that the shape of the observation target is observed in detail.

A conventional microscope 41 capable of performing the inclined observation will be described based on FIGS. 11 to 14. It is to be noted that two directions orthogonal to each other within a horizontal plane are taken as an x-axis and a y-axis, and a direction vertical to the x-axis and the y-axis is taken as a z-axis. A base of the microscope 41 is fitted with an upper stage lift 43 and a lower stage lift 44. The upper stage lift 43 is fitted with an imaging section 46 as a head section 45 via a fitting member, not shown. The head section 45 is vertically movable with respect to the upper stage lift 43. The base is provided with a swinging axis 47 extending in a y-axis direction (a direction vertical to the plane of drawing of FIGS. 11 to 14), and the upper stage lift 43 is swingable about the swinging axis 47.

Meanwhile, a stage 49 on which an observation target is mounted is fitted to the top surface side of the lower stage lift 44. The stage 49 is vertically movable by operation of a knob 50 mounted in the lower stage lift 44.

In such a microscope, it is possible to perform the inclined observation where the imaging section is inclined and observation is performed. Meanwhile, in the inclined observation, it is important to perform eucentric observation where the observation target remains displayed in the visual field even when the imaging section is inclined. In other words, it is of necessity to avoid a portion of the observation target getting out of the visual field when the imaging section is inclined.

Hereinafter, there will be shown an operation procedure for the microscope 41 for realizing the eucentric observation. From the state shown in FIG. 11, the knob 50 of the lower stage lift 44 is turned to raise the stage 49 and match the top surface of the stage 49 to the swinging axis 47 (cf. FIG. 12). Next, by operation of the upper stage lift 43, the head section 45 is raised or lowered to focus the imaging section 46 on the top surface of the stage 49 (cf. FIG. 13). Further, after placement of an observation target S on the top surface of the stage 49, the lower stage lift 44 is lowered to focus the imaging section 46 on a desired observation target surface on the observation target S. In this state, it is possible to perform the eucentric observation where the observation target surface does not get out of the visual field even when the upper stage lift 43 is swung about the swinging axis 47 (cf. FIG. 14).

Unless the operation just as the above operation procedure is performed to match the observation target surface to the swinging axis 47, when the imaging section is inclined, the observation target surface gets out of the visual field or the focus is blurred, thus making it impossible to perform the eucentric observation. However, the above configuration requires constant operation just as the foregoing operation procedure, which has caused a problem of taking time. Especially in the case of manually vertically moving the lower stage lift 44, the operation needs to be performed just as the foregoing operation procedure, which is troublesome. Further, in the case of electrically moving the upper stage lift 43, even when the observation target surface is not matched to the swinging center of the swinging axis 47, the observation target surface may automatically come into focus. As a result, it is not possible to avoid a state where, even though the observation target surface is in focus, it gets out of the visual field at the time of the inclined observation.

SUMMARY OF THE INVENTION

The present invention has been made for solving the conventional problems as described above. An object of the present invention is to provide a microscope capable of inclining an imaging section and automatically matching a height position of an observation target to eucentric position.

In order to achieve the above object, a microscope of the present invention includes: a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; and an upper stage lifting section that vertically movably supports the fitting unit along an optical axis of the imaging unit, and is swingable about a swinging axis orthogonal to the optical axis of the imaging unit. In a state where the imaging unit is focused on a height position of the swinging axis, the first driving mechanism drives the lower stage lifting section such that the surface of the observation target placed on the placement section is matched to the height position of the swinging axis.

According to the above configuration, the fitting unit supported by the upper stage lifting section can be moved along the optical axis of the imaging unit, to focus the imaging unit on the height position of the swinging axis. The first driving mechanism can drive the lower stage lifting section such that the imaging unit is focused on the observation target surface, to automatically move the placement section to a position where the imaging unit is focused on the observation target surface. Herewith, even without a user manually performing complicated operation, it is possible to automatically match the height position of the observation target surface to a eucentric position, so as to swing the upper stage lifting section about the swinging axis and perform eucentric observation.

Further, a second driving mechanism for driving the upper stage lifting section is provided, and the second driving mechanism moves the upper stage lifting section such that the imaging unit is focused on the height position of the swinging axis.

According to the above configuration, the second driving mechanism can drive the upper stage lifting section, to automatically focus the imaging unit, fitted to the fitting unit, on the height position of the swinging axis.

Further, in a state where the placement section is moved in the horizontal direction and the observation target surface is moved in the horizontal direction, the first driving mechanism matches an observation target surface newly positioned on the swinging axis to the swinging axis based on focal distance information stored in the first driving mechanism.

According to the above configuration, it is possible to match the observation target surface newly positioned on the swinging axis to the swinging axis based on the focal distance information stored in the first driving mechanism.

Further, the imaging unit moves along the optical axis of the imaging unit in the state of being supported by the upper stage lifting section that swings about the swinging axis, and depth synthesis for synthesizing pixels at positions where the imaging unit is focused is performed by moving the imaging unit while changing in stages a distance between the imaging unit and the observation target surface.

According to the above configuration, it is possible to perform depth synthesis in the state of performing inclined observation on the observation target surface.

Further, the first driving mechanism returns the lower stage lifting section to a position where the imaging unit is focused on the swinging axis after the imaging unit has performed the depth synthesis.

According to the above configuration, in the case of observing the observation target after performing the depth synthesis, it is possible to prevent the imaging unit from not being focused on the observation target surface.

Further, the observation target is placed on the placement section in a state where the placement section is moved to a lowest position by the first driving mechanism.

According to the above configuration, at the time of placing the observation target on the placement section, it is possible to prevent the observation target from coming into contact with the imaging unit or the like.

A magnifying observation method for a microscope includes: a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; and an upper stage lifting section that vertically movably supports the fitting unit along an optical axis of the imaging unit, and is swingable about a swinging axis orthogonal to the optical axis of the imaging unit. The method includes: a first step in which the first driving mechanism positions the placement section at a lowest position; a second step in which the upper stage lifting section is moved such that the imaging unit fitted to the fitting unit is focused on a height position of the swinging axis; a third step in which the observation target is placed on the placement section positioned at the lowest position; and a fourth step in which the first driving mechanism drives the lower stage lifting section to automatically move the placement section to a position where the imaging unit is focused on the observation target surface.

According to the above configuration, the fitting unit supported by the upper stage lifting section can be moved along the optical axis of the imaging unit, to focus the imaging unit on the height position of the swinging axis. The first driving mechanism can drive the lower stage lifting section such that the imaging unit is focused on the observation target surface, to automatically move the placement section to a position where the imaging unit is focused on the observation target surface. Herewith, even without the user manually performing complicated operation, it is possible to automatically match the height position of the observation target surface to a eucentric position, so as to swing the upper stage lifting section about the swinging axis and perform eucentric observation.

Moreover, a magnifying observation method for a microscope includes; a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; an upper stage lifting section that vertically movably supports the fitting unit along an optical axis of the imaging unit, and is swingable about a swinging axis orthogonal to the optical axis of the imaging unit; and a second driving mechanism that drives the upper stage lifting section. The method includes: a first step in which the first driving mechanism positions the placement section at a lowest position; a second step in which the second driving mechanism drives the upper stage lifting section such that the imaging unit fitted to the fitting unit is focused on a height position of the swinging axis; a third step in which the observation target is placed on the placement section positioned at the lowest position; and a fourth step in which the first driving mechanism drives the lower stage lifting section to automatically move the placement section to a position where the imaging unit is focused on the observation target surface.

According to the above configuration, the second driving mechanism can drive the upper stage lifting section, to automatically focus the imaging unit, fitted to the fitting unit, on the height position of the swinging axis.

A eucentric magnifying observation method for a microscope includes: a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; an upper stage lifting section that vertically movably supports the fitting unit along an optical axis of the imaging unit, and is swingable about a swinging axis orthogonal to the optical axis of the imaging unit; and a second driving mechanism that drives the upper stage lifting section. The method includes: a first step in which the first driving mechanism positions the placement section at a lowest position; a second step in which the second driving mechanism drives the upper stage lifting section such that the imaging unit fitted to the fitting unit is focused on a height position of the swinging axis; a third step in which the observation target is placed on the placement section positioned at the lowest position; a fourth step in which the first driving mechanism drives the lower stage lifting section to automatically move the placement section to a position where the imaging unit is focused on the observation target surface; and a fifth step in which the upper stage lifting section is swung about the swinging axis.

According to the above configuration, the upper stage lifting section can be swung about the swinging axis, to perform eucentric magnifying observation.

A magnifying observation method for a microscope includes: a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; an upper stage lifting section that vertically movably supports the fitting unit along an optical axis of the imaging unit, and is swingable about a swinging axis orthogonal to the optical axis of the imaging unit; and a second driving mechanism that drives the upper stage lifting section. The method includes: a first step in which the first driving mechanism positions the placement section at a lowest position; a second step in which the second driving mechanism drives the upper stage lifting section such that the imaging unit fitted to the fitting unit is focused on a height position of the swinging axis; a third step in which the observation target is placed on the placement section positioned at the lowest position; a fourth step in which the first driving mechanism drives the lower stage lifting section to automatically move the placement section to a position where the imaging unit is focused on the observation target surface; a fifth step in which the placement section is moved in the horizontal direction to position the observation target surface on the swinging axis; and a sixth step in which the first driving mechanism matches the observation target surface positioned on the swinging axis to the swinging axis based on focal distance information stored in the first driving mechanism.

According to the above configuration, it is possible to easily match an observation target surface newly positioned on the swinging axis onto the swinging axis based on the focal distance information stored in the first driving mechanism.

Moreover, a eucentric magnifying observation method for a microscope includes: a placement section on which an observation target is placed, the placement section movable in a horizontal direction; a lower stage lifting section that vertically movably supports the placement section; a first driving mechanism that drives the lower stage lifting section; an imaging unit that captures an image of the observation target; a fitting unit that is fitted with the imaging unit; an upper stage lifting section that vertically movably supports the fitting unit along an optical axis of the imaging unit, and is swingable about a swinging axis orthogonal to the optical axis of the imaging unit; and a second driving mechanism that drives the upper stage lifting section. The method includes: a first step in which the first driving mechanism positions the placement section at a lowest position; a second step in which the second driving mechanism drives the upper stage lifting section such that the imaging unit fitted to the fitting unit is focused on a height position of the swinging axis; a third step in which the observation target is placed on the placement section positioned at the lowest position; a fourth step in which the first driving mechanism drives the lower stage lifting section to automatically move the placement section to a position where the imaging unit is focused on the observation target surface; a fifth step in which the placement section is moved in the horizontal direction to position the observation target surface on the swinging axis; a sixth step in which the first driving mechanism matches the observation target surface positioned on the swinging axis to the swinging axis based on focal distance information stored in the first driving mechanism; and a seventh step in which the upper stage lifting section is swung about the swinging axis.

According to the above configuration, an observation target surface newly positioned on the swinging axis can be easily matched to the swinging axis based on the focal distance information stored in the first driving mechanism, to swing the upper stage lifting section about the swinging axis and perform eucentric magnifying observation of the observation target surface.

DETAILED DESCRIPTION OF PREFERRED EMBODIMENT

Hereinafter, an embodiment of the present invention will be described based on the drawings. However, the embodiment shown hereinafter merely illustrates a microscope and an imaging method using the same for the purpose of embodying technical ideas of the present invention, and the present invention does not specify the microscope and the imaging method using the same to those described below. Further, the present specification does not specify members shown in the claims to members of the embodiment. Especially, sizes, materials, shapes, relative disposition and the like of constituent components described in the embodiment are not intended to restrict the scope of the present invention thereto, but are mere explanatory examples unless otherwise specified. It is to be noted that sizes, positional relations and the like of members shown in each of the drawings may be exaggerated for clarifying a description. Further, in the following description, the same name or symbol denotes the same member or members of the same quality, and a detailed description thereof will be omitted as appropriate. Moreover, each element constituting the present invention may have a mode where a plurality of elements are configured of the same member and the one member may serve as the plurality of elements, or conversely, a function of one member can be shared and realized by a plurality of members.

Figure 1:
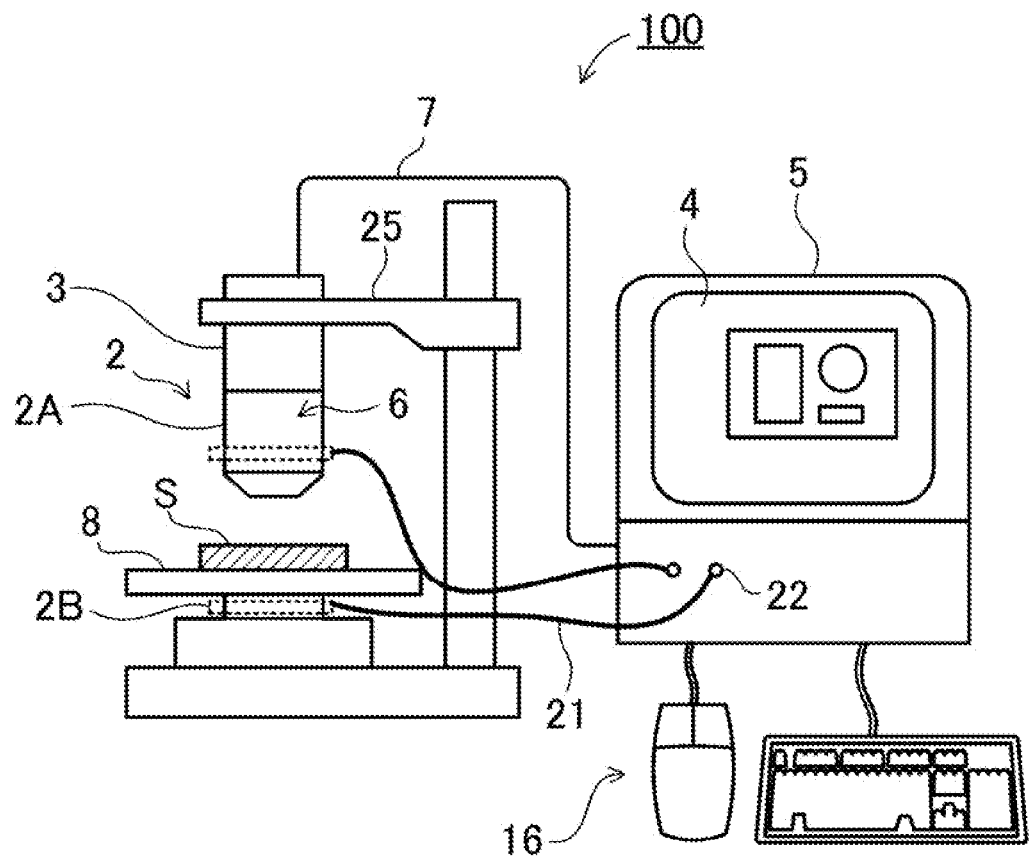
FIG. 1 is an external view of a microscope according to one embodiment of the present invention.

Hereinafter, with reference to FIGS. 1 to 10, a microscope 100 according to one embodiment of the present invention will be described. As shown in FIG. 1, the microscope 100 is provided with: an illumination unit 2 for illuminating an observation target (or a workpiece or another subject) S, an imaging section 3 as an imaging unit for capturing an image of the observation target S illuminated by the illumination unit 2; and a body section 5 having a display unit 4 for displaying a magnified image captured by the imaging section 3. The imaging section 3 is connected as a head section 6 with the body section 5 via a cable section 7. The head section 6 is fitted to a fitting member 25. Further, the microscope 100 is provided with: a stage 8 on which the observation target S is placed; an imaging element 12 for electrically reading reflected light or transmitted light, incident via an optical system 9 and comes from the observation target S placed on the stage 8; and a lower stage lift 13 as a focus adjusting section for changing a relative distance between the stage 8 and the optical system 9 in an optical axis direction to adjust a focus.

Figure 2:
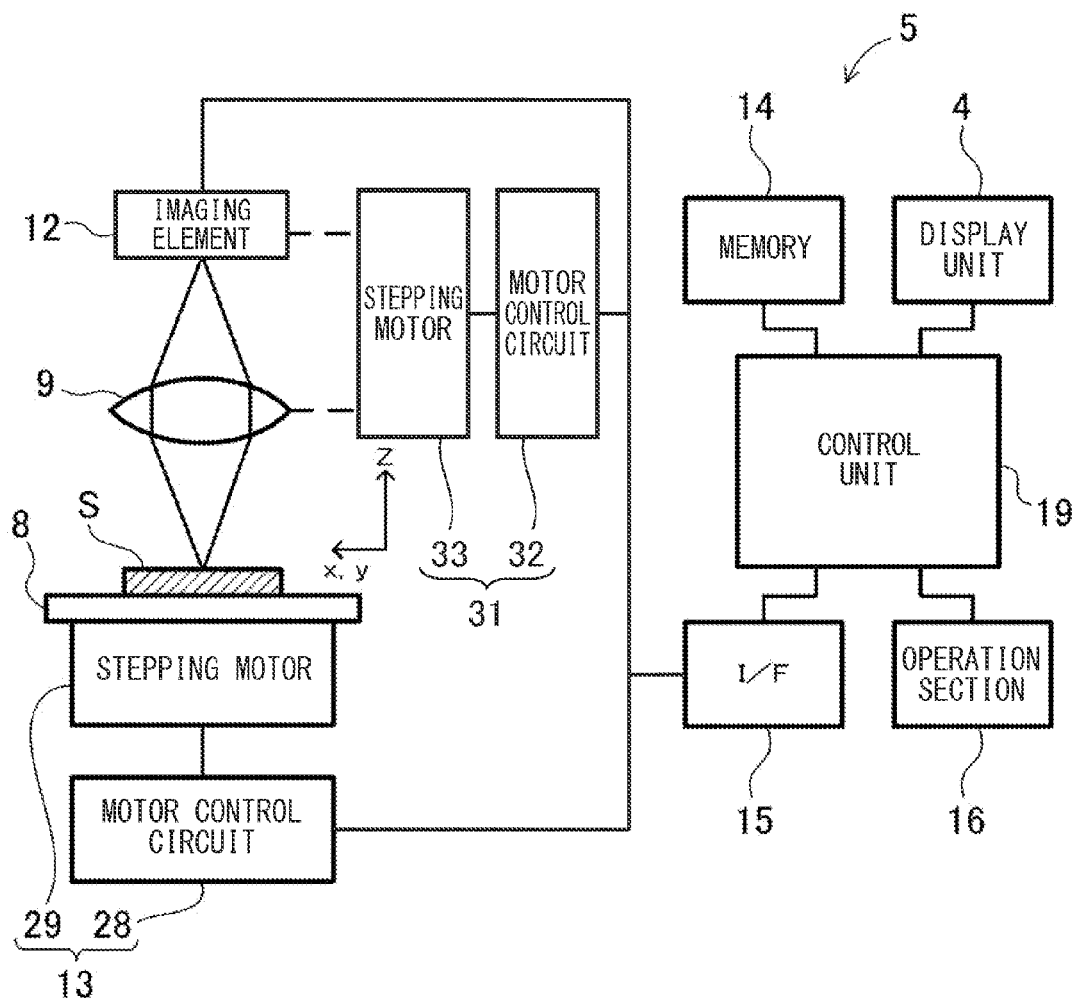
FIG. 2 is a block diagram of the microscope according to one embodiment of the present invention.
Figure 3:
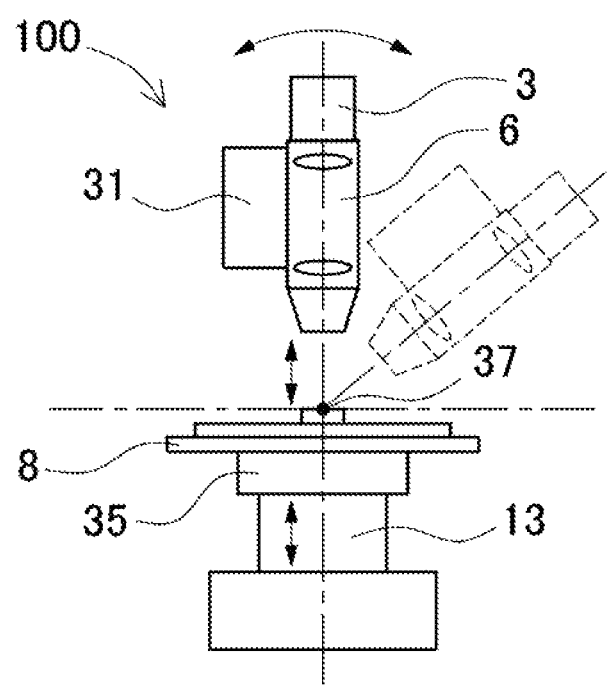
FIG. 3 is a schematic front view of the microscope.
Figure 4:
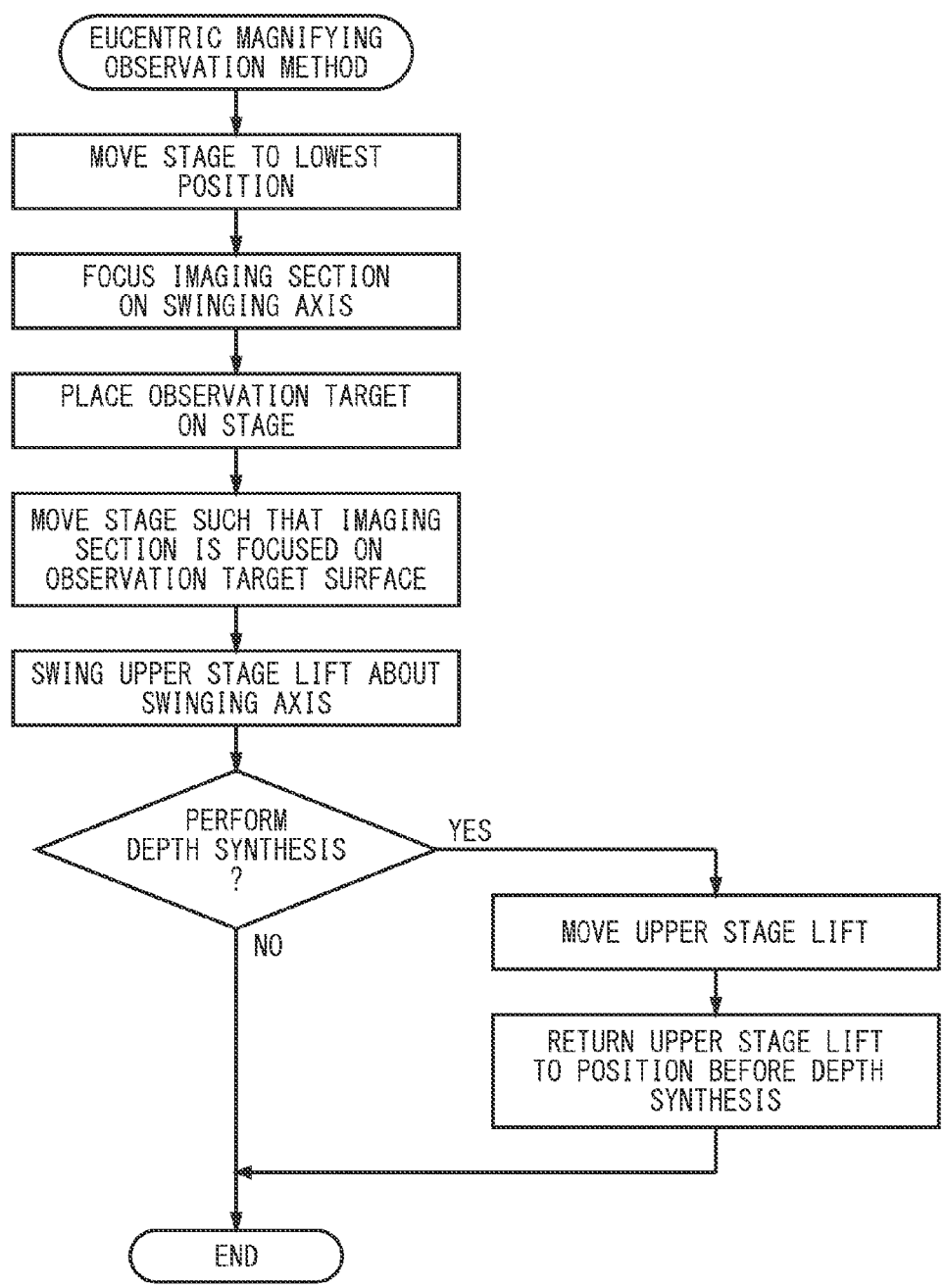
FIG. 4 is a flowchart of a eucentric magnifying observation method.

Moreover, as shown in FIG. 2, the body section 5 is provided with: a memory 14 as a focal distance information storing section for storing focal distance information on a relative distance between the stage 8 and the optical system 9 in the optical axis direction at the time of adjusting a focus by the lower stage lift 13 along with two-dimensional position information of the observation target S within a plane almost vertical to the optical axis direction; the display unit 4 for displaying an image read by the imaging element 12; and an interface 15 for performing data communication with the head section 6 and the lower stage lift 13. This microscope 100 captures an observation image by use of the imaging element 12 for electrically reading reflected light or transmitted light, which is incident via the imaging optical system 9 and comes from the observation target S fixed to the stage 8, and displays the image on the display unit 4.

Further, the microscope 100 is provided with: an operation section 16 as a region setting section capable of setting a region on an image displayed by the display unit 4; and a control unit 19 for computing the height of the observation target S in the optical axis direction corresponding to a region set by the region setting section based on focal distance information on part or all of the observation target S corresponding to a region set by the region setting section, the information being stored in the memory 14. This microscope 100 can compute an average height (depth) of the observation target S in the optical axis direction which corresponds to a region specified by use of the imaging element 12.

The operation section 16 is connected with the body section 5 or the computer in a wired or wireless manner, or fixed to the computer. Examples of the general operation section 16 include a variety of pointing devices such as a mouse, a keyboard, a slide pad, TrackPoint, a tablet, a joystick, a console, a jog dial, a digitizer, a light pen, a numeric keypad, a touch pad, and ACCUPOINT. Further, each of these operation sections 16 can be used for operations of the microscope 100 itself and its peripheral devices, in addition to an operation of a magnifying observation operating program. Moreover, a touch screen or a touch panel can be used as a display itself for displaying an interface screen and a user can directly touch the screen to perform input and an operation, or video input or other existing input means can be used. Both of these can also be used at the same time. In the example of FIG. 1, the operation section 16 is configured of a pointing device such as a mouse.

(Illumination Unit 2)

The illumination unit 2 generates illumination light for illuminating the observation target S whose image is formed in the imaging element 12. The illumination light source of the illumination unit 2 is installed in the body section 5, and illumination light is transmitted to the illumination unit 2 of the head section 6 via an optical fiber 21. The illumination unit 2 can adopt either a configuration of a system incorporated into the head section 6 or a configuration of a detachable section from the head section 6. Further, as an illumination system for illumination light, epi-illumination, transmission illumination and the like can be used as appropriate. The illumination unit 2 shown in FIG. 1 is provided with an epi-illuminator 2A for irradiating the observation target S with epi-illumination light, and a transmittance illuminator 2B for performing irradiation with transmitted light. Each of these illuminators is connected with the body section 5 via the optical fiber 21. The body section 5 is provided with a connector 22 for connecting the optical fiber 21, and also installed with the illumination light source for transmitting light to the optical fiber 21 via the connector 22. Further, the epi-illuminator 2A is a ring illuminator. The ring illuminator can switch between all-around illumination and side illumination. In order to realize this, there can be used a turret type mask for cutting off part of illumination light, a configuration in which a plurality of LEDs are arranged in a ring form as the ring illuminator and part of the LEDs are turned on/off, or some other configuration.

(Illumination Light Source)

As the illumination light source, there can be used a semiconductor light emitting element such as an LED (Light Emitting Diode) or an LD (Laser Diode). For example, LEDs having wavelength regions of RGB are prepared, and illumination light can be switched to red, green or blue by lighting of each LED, or white light can be obtained by mixing these colors. Since the LED is especially excellent in on/off responsiveness, it is also possible to obtain an advantage of allowing improvement in throughput of measurement. Further, the LED is also provided with features of having a long lifetime, low power consumption, a low calorific value and resistance to a mechanical shock. Alternatively, the LED may be the light source using a wavelength converting member such as a fluorescent substance that is excited by ultraviolet rays or visible rays as light source light. Herewith, even one LED can emit white light. Further, an LED capable of performing irradiation with ultraviolet light or infrared light, in addition to visible light, can also be used as the light source. For example, observation by means of infrared light is useful in analysis of a defective product, tissue distribution of a biological tissue, and the like. It is to be noted that the illumination light source is not restricted to the semiconductor light emitting element, but a halogen lamp, a xenon lamp, an HID lamp or the like may be used as a white light source for emitting white light with a wide wavelength region. Further, the light source may be capable of performing irradiation with infrared light as well as visible light. The halogen lamp is particularly preferred since its light-emitting wavelength has a wide wavelength region. Moreover, not only a single light source is used, but a plurality of light sources can be provided. These can be simultaneously lighted and the mixed light can be used as illumination light, or these can be switched for illumination.

By input of control data on control of a stepping motor 29 into a motor control circuit 28, the body section 5 changes a relative distance in the optical axis direction between the stage 8 and the head section 6 having the optical system 9 and the imaging element 12, the distance being the height in the z-direction in this case. Specifically, by input of control data necessary for controlling the lower stage lift 13 into the motor control circuit 28, the body section 5 controls rotation of the stepping motor 29 and increases or decreases a height z (position in the z-direction) of the stage 8. The stepping motor 29 generates a rotation signal in accordance with rotation. Based on the rotation signal inputted via the motor control circuit 28, the body section 5 stores the height z of the stage 8 as information on the relative distance between the stage 8 and the optical system 9 in the optical axis direction. This stage 8 functions as an observation positioning unit for performing positioning of an observation position on the observation target S. The body section 5, the motor control circuit 28 and the stepping motor 29 constitute a first driving mechanism.

In the following description, two directions orthogonal to each other within a horizontal plane are taken as an x-axis and a y-axis, and a direction vertical to the x-axis and the y-axis is taken as a z-axis.

The stage 8 mounted on the top surface side of the lower stage lift 13 can be driven by, for example, a stepping motor or the like, to move in the x-axis direction and the y-axis direction, and any position of the stage 8 can be matched to the optical axis of the imaging section 3. Further, the stage 8 is fitted to a θ stage 35 rotatable about the z-axis, and the observation target surface that is matched to the optical axis of the imaging section can be rotated and observed.

By input of control data on control of a stepping motor 33 into a motor control circuit 32, the body section 5 changes the height of the head section 6, having the imaging element 12, in the optical axis direction. Specifically, by input of control data, which is necessary for controlling an upper stage lift 31 and based on type information of a lens section or the like, into the motor control circuit 32, the body section 5 controls rotation of the stepping motor 33 and increases or decreases a height z (position in the z-direction) of the head section 6 having the imaging element 12. The stepping motor 33 generates a rotation signal in accordance with rotation. Based on the rotation signal inputted via the motor control circuit 32, the body section 5 stores the height z of the head section 6 based on the type information of the lens section or the like. The body section 5, the motor control circuit 32 and the stepping motor 33 constitute a second driving mechanism.

Figure 5:
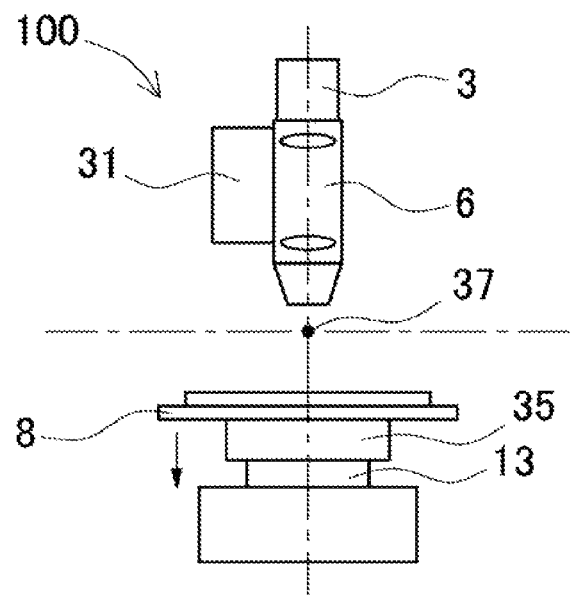
FIG. 5 is a schematic view of the microscope where a stage has moved to the lowest position.

Here, a procedure for performing magnifying observation by use of the microscope 100 will be described based on a flowchart of FIG. 4, and FIGS. 5 to 10. For example, when the user presses an initialization button, not shown, the body section 5 inputs control data of the stepping motor 29 into the motor control circuit 28, to drive the lower stage lift 13 and move the stage 8 to the lowest position. FIG. 5 shows a state at this time.

Figure 6:
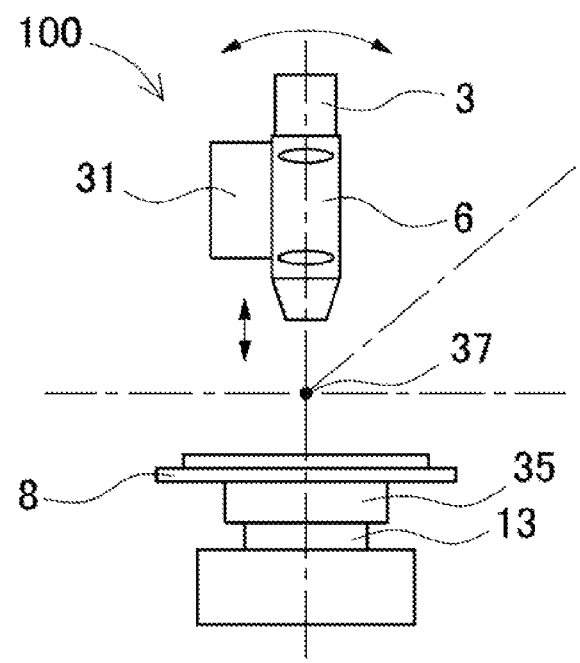
FIG. 6 is a schematic view of the microscope where an imaging section is focused on a swinging axis.

The body section 5 inputs control data based on type information of the lens section or the like into the motor control circuit 32, and the upper stage lift 31 increases or decreases the height z (position in the z-direction) of the head section 6 having the imaging element 12. Assuming that the observation target S is placed on the stage 8 and the height of the observation target surface is matched to the height of a swinging axis 37, the body section 5 holds the head section 6 at the height z where the imaging section 3 is focused on the observation target surface. FIG. 6 shows a state at this time.

It is to be noted that, when the type information of the lens section or the like, which is necessary for control of the height z (position in the z-direction) of the head section 6, is not stored in the body section 5, the body section 5 moves the head section 6 to a predetermined highest position and lowers the head section 6, having moved to the highest position, from the highest position. Assuming that the observation target S is placed on the stage 8 and the height of the observation target surface is matched to the height of the swinging axis 37, the body section 5 holds the head section 6 at the height z where the imaging section 3 is focused on the observation target surface.

Figure 7:
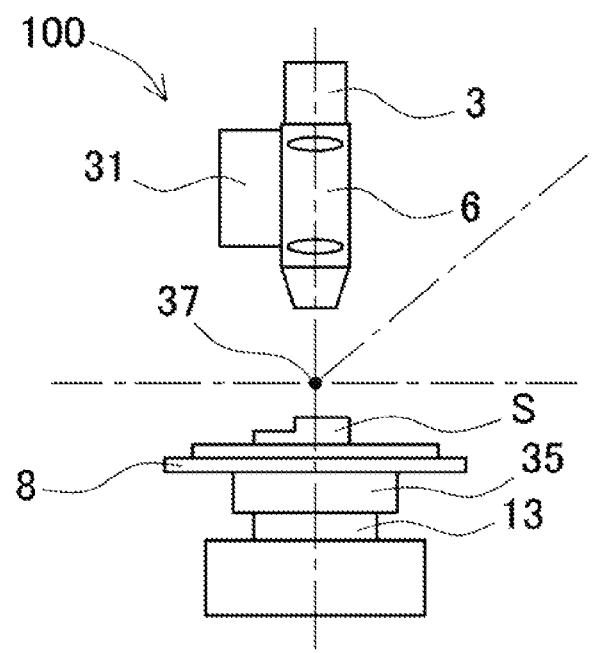
FIG. 7 is a schematic view of the microscope where an observation target is placed on the stage positioned at the lowest position.

Next, the observation target S is placed on the top surface of the stage 8 positioned at the lowest position. FIG. 7 shows a state at this time. With the stage 8 positioned at the lowest position, when the observation target S is placed on the stage 8, it is possible to prevent the observation target S from coming into contact with the head section 6 having the imaging element 12.

(Plane Observation)

Figure 8:
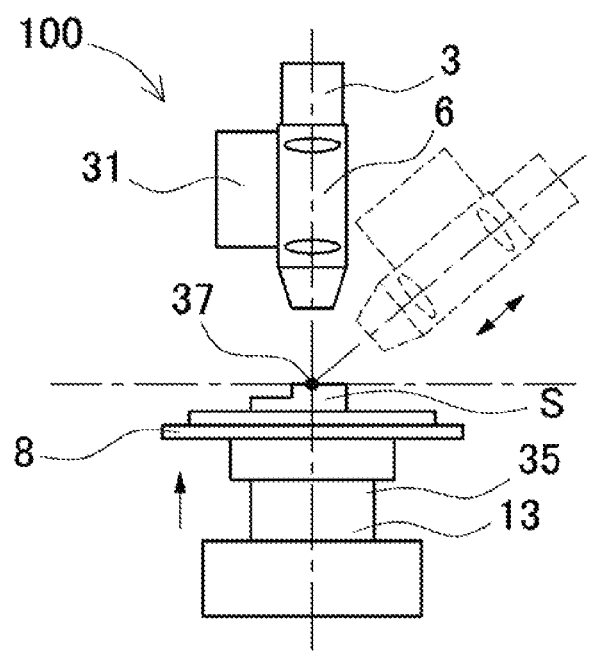
FIG. 8 is a schematic view of the microscope where the observation target surface is matched to the swinging axis by raising the stage.

In order to focus the imaging section 3 on the observation target surface of the observation target S placed on the stage 8, the body section 5 raises the stage 8 and the θ stage 35, which are placement stages, along the z-axis to match the observation target surface of the observation target S to the swinging axis 37. FIG. 8 shows a state at this time. When the observation target surface is not located on the optical axis of the imaging section 3, the body section 5 moves the stage 8 in the x-axis direction and/or the y-axis direction to position the observation target surface on the optical axis of the imaging section 3, and thereafter raises the stage 8 and the θ stage 35 along the z-axis, to match the observation target surface of the observation target S to the swinging axis 37. The user can perform plane observation on the observation target surface of the observation target S that is matched to the swinging axis 37 by use of the display unit 4. By the body section 5 driving the θ stage 35, the plane observation can also be performed in a state where the observation target surface is rotated.

(Inclined Observation)

Further, in the case of performing inclined observation where the head section 6 is swung, it is possible to perform the inclined observation on the observation target surface in a state where the upper stage lift 31 is manually swung about the swinging axis 37 in the y-axis direction to incline the head section 6 (cf. FIG. 8). In this state of the head section 6 being inclined, the imaging section 3 is focused on the observation target surface, and the observation target surface displayed on a display unit 52 at the time of the plane observation does not move on a screen of the display unit 52 but remains displayed at the position where it is displayed at the time of the plane observation. In such a manner, eucentric observation can be performed.

Figure 9:
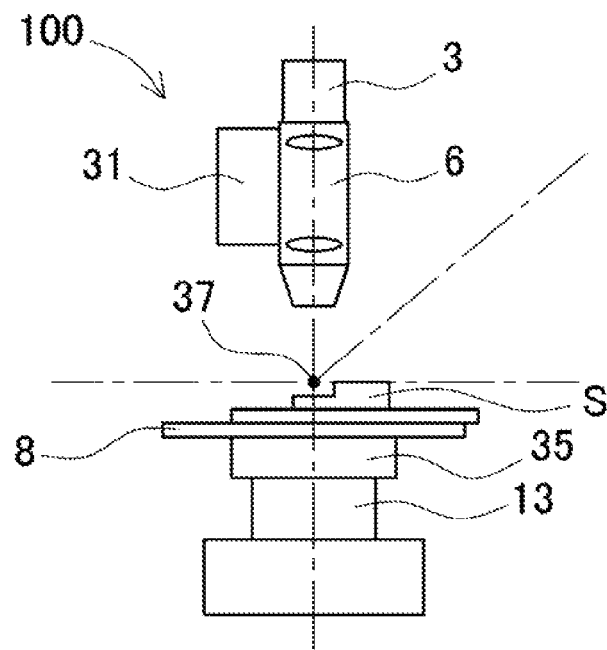
FIG. 9 is a schematic view of the microscope where a new observation target surface is positioned on the swinging axis.
Figure 10:
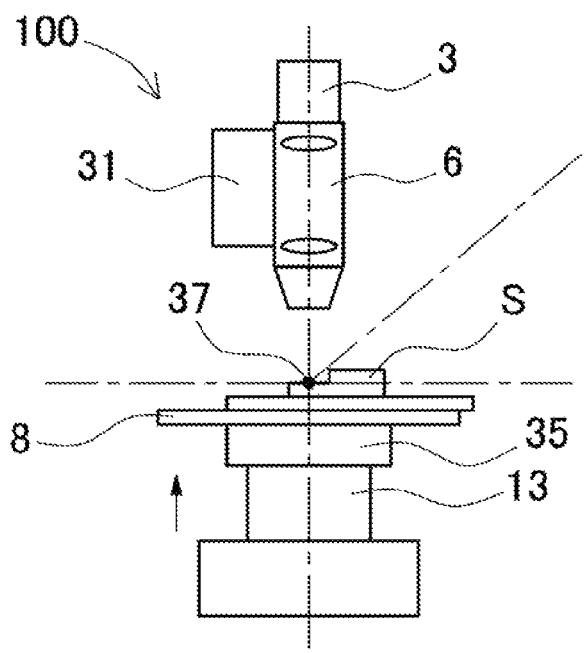
FIG. 10 is a schematic view of the microscope where a new observation target surface is matched to the swinging axis by raising the stage.
Figure 11:
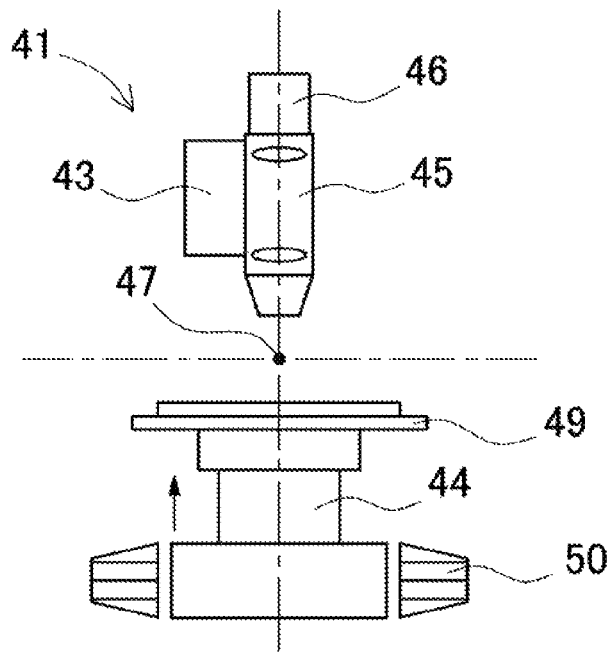
FIG. 11 is a schematic view showing an operation procedure for a conventional microscope.
Figure 12:
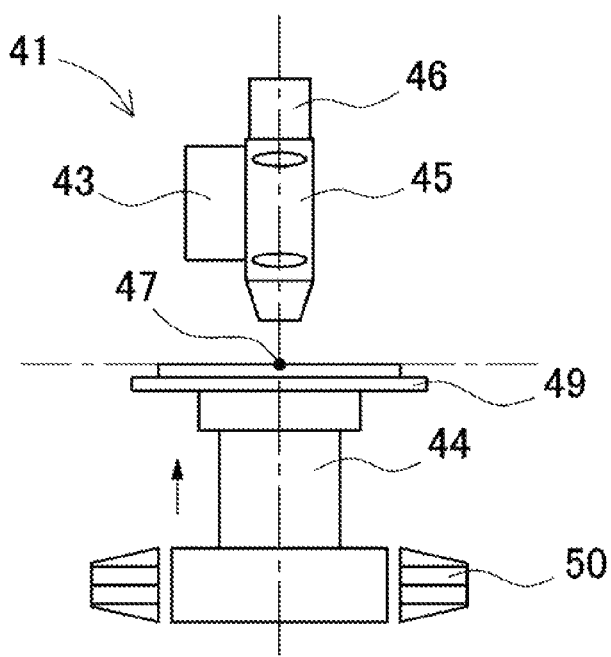
FIG. 12 is a schematic view showing the operation procedure for the conventional microscope.
Figure 13:
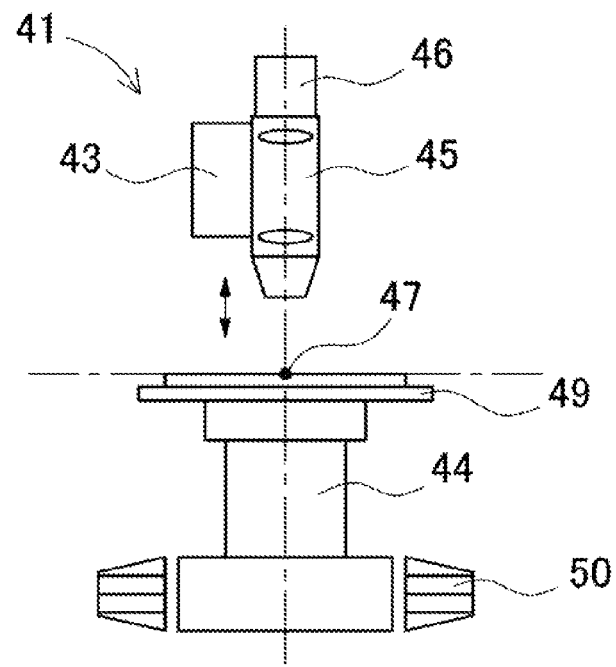
FIG. 13 is a schematic view showing the operation procedure for the conventional microscope.
Figure 14:
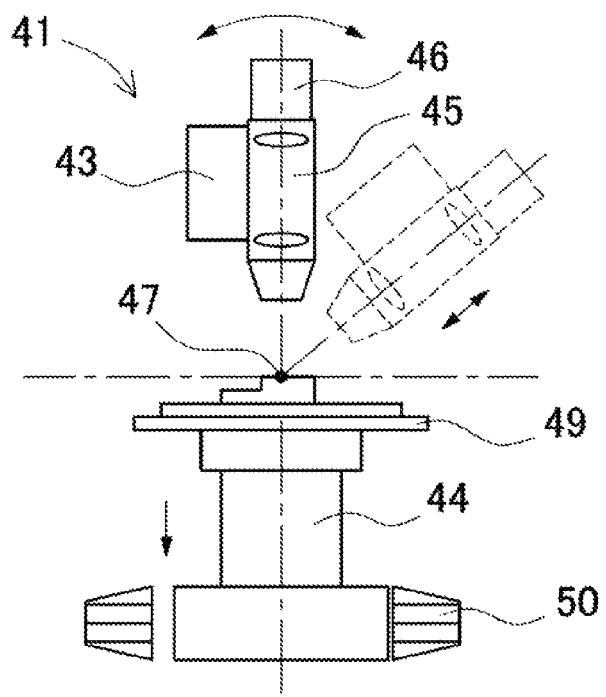
FIG. 14 is a schematic view showing the operation procedure for the conventional microscope.

At the time of performing the plane observation, there may be cases where a new portion placed on the stage 8 is to be observed by moving the stage 8 in the horizontal direction. In such a case, the body section 5 moves the stage 8 in the x-axis direction and/or the y-axis direction to position an observation target surface of the new portion on the swinging axis 37. FIG. 9 shows a state at this time. The body section 5 moves the stage 8 to the lowest position again, and thereafter moves the placement stage (stage 8 and θ stage 35) along the z-axis direction to match the observation target surface onto the swinging axis 37 so as to focus the imaging section 3 on the observation target surface. FIG. 10 shows a state at this time. In this state, the observation target surface can be subjected to the plane observation by use of the display unit 52 and the like.

In this case, when focal distance information on the observation target surface is stored into the memory 14, the control unit 19 can compute the height of the observation target S in the optical axis direction based on the focal distance information stored in the memory 14, to match the observation target surface onto the swinging axis 37. In this case, it is possible to omit the step of moving the stage 8 to the lowest position, so as to promptly capture an image of the observation target surface.

Although the upper stage lift 31 electrically movably supports the stage 8 and the θ stage as the placement stage by the second driving mechanism configured by the body section 5, the motor control circuit 32 and the stepping motor 33, the present invention is not limited thereto. It is also possible to manually move the stage 8 and the θ stage by the user turning a knob mounted in the upper stage lift 31.

(Depth Synthesis)

Depth synthesis can be performed when the plane observation or the inclined observation is being performed on the observation target S. In a state where the imaging section 3 is focused on the observation target surface, the control unit 19 moves the imaging section 3 while changing in stages the distance between the imaging section 3 and the observation target surface to synthesize pixels at positions where the imaging section 3 is focused, whereby it is possible to create a focused image or 3D shape data of the whole image. In addition, after the depth synthesis is performed, the control unit 19 returns the head section 6 to a position where the imaging section 3 is focused on the observation target surface. Herewith, it is possible to prevent the imaging section 3 from being not focused on the observation target surface at the time of performing the inclined observation.

What is claimed is:

1. A microscope comprising:
   a placement stage having a placement surface for placing an object;
   a head section, having an optical axis, including a camera configured to acquire an observation image of an object on the placement surface, and a lens coupled to the camera;
   a first motorized stage lift coupled to the placement stage, and configured to change a vertical position of the placement stage along a first direction orthogonal to the placement surface;
   a second motorized stage lift coupled to the head section, configured to change a position of the head section along the optical axis of the head section and configured to change an angular position of the head section around a swinging axis orthogonal to the optical axis of the head section so as to perform an inclined observation; and
   a controller operably coupled to the head section, the first motorized stage lift, and the second motorized stage lift, configured to:
   for an eucentric positioning, control the second motorized stage lift to change the position of the head section along the optical axis of the head section based on a pre-stored information in response to a user instruction such that a focal position of the head section matches to a height position of the swinging axis where the optical axis of the head section and the first direction orthogonal to the placement surface are in parallel, and control the first motorized stage lift to change the vertical position of the placement stage along the first direction based on the observation image acquired by the camera such that a surface of the object placed on the placement surface is matched to the focal position of the head section where the optical axis of the head section and the first direction orthogonal to the placement surface are in parallel, and the focal position of the head section matches to the height position of the swinging axis, and
   for a depth synthesis, control the second motorized stage lift to change the position of the head section along the optical axis of the head section to acquire the observation images at different positions of the head section by the camera, and synthesize in-focus pixels of the observation images acquired by the camera to generate a synthesized image.

2. The microscope according to claim 1, wherein the placement stage is capable of moving in a horizontal direction, and wherein when the placement stage is moved in the horizontal direction and the surface of the object is moved in the horizontal direction, the controller is further configured to control the first motorized stage lift to change the vertical position of the placement stage such that a surface of the object newly placed on the placement surface is matched to the focal position of the head section.

3. The microscope according to claim 1, wherein the controller is further configured to control the first motorized stage lift to return the vertical position of the placement stage to a position where the surface of the object placed on the placement surface is matched to the focal position of the head section after the pixels are synthesized by the controller.

4. The microscope according to claim 1, wherein the controller is further configured to control the first motorized stage lift to change the vertical position of the placement stage such that the placement stage is moved to a lowest position.

5. A magnifying observation method for a microscope including: a placement stage having a placement surface, a head section, having an optical axis, including a camera configured to acquire an observation image of an object on the placement surface, and a lens coupled to the camera, a first motorized stage lift coupled to the placement stage, and configured to change a vertical position of the placement stage along a first direction orthogonal to the placement surface, a second motorized stage lift coupled to the head section, configured to change a position of the head section along the optical axis of the head section and configured to change an angular position of the head section around a swinging axis orthogonal to the optical axis of the head section so as to perform an inclined observation, the method includes:
   in an eucentric positioning process, controlling, via a controller, the second motorized stage lift to change the position of the head section along the optical axis of the head section based on a pre-stored information in response to a user instruction such that a focal position of the head section matches to a height position of the swinging axis where the optical axis of the head section and the first direction orthogonal to the placement surface are in parallel;
   in the eucentric positioning process, controlling, via the controller, the first motorized stage lift to change the vertical position of the placement stage along the first direction based on the observation image acquired by the camera such that a surface of the object placed on the placement surface is matched to a focal position of the head section where the optical axis of the head section and the first direction orthogonal to the placement surface are in parallel and the focal position of the head section matches to the height position of the swinging axis;

in a depth synthesis process, controlling, via the controller, the second motorized stage lift to change the position of the head section along the optical axis of the head section to acquire the observation images at different positions of the head section by the camera; and
in the depth synthesis process, synthesizing, via the controller, in-focus pixels of the observation images acquired by the camera to generate a synthesized image.

* * * * *